Sept. 24, 1968     C. H. ZWEIFEL     3,402,824
CONVERTIBLE CARGO HANDLING SYSTEM
Filed July 25, 1966     4 Sheets-Sheet 1
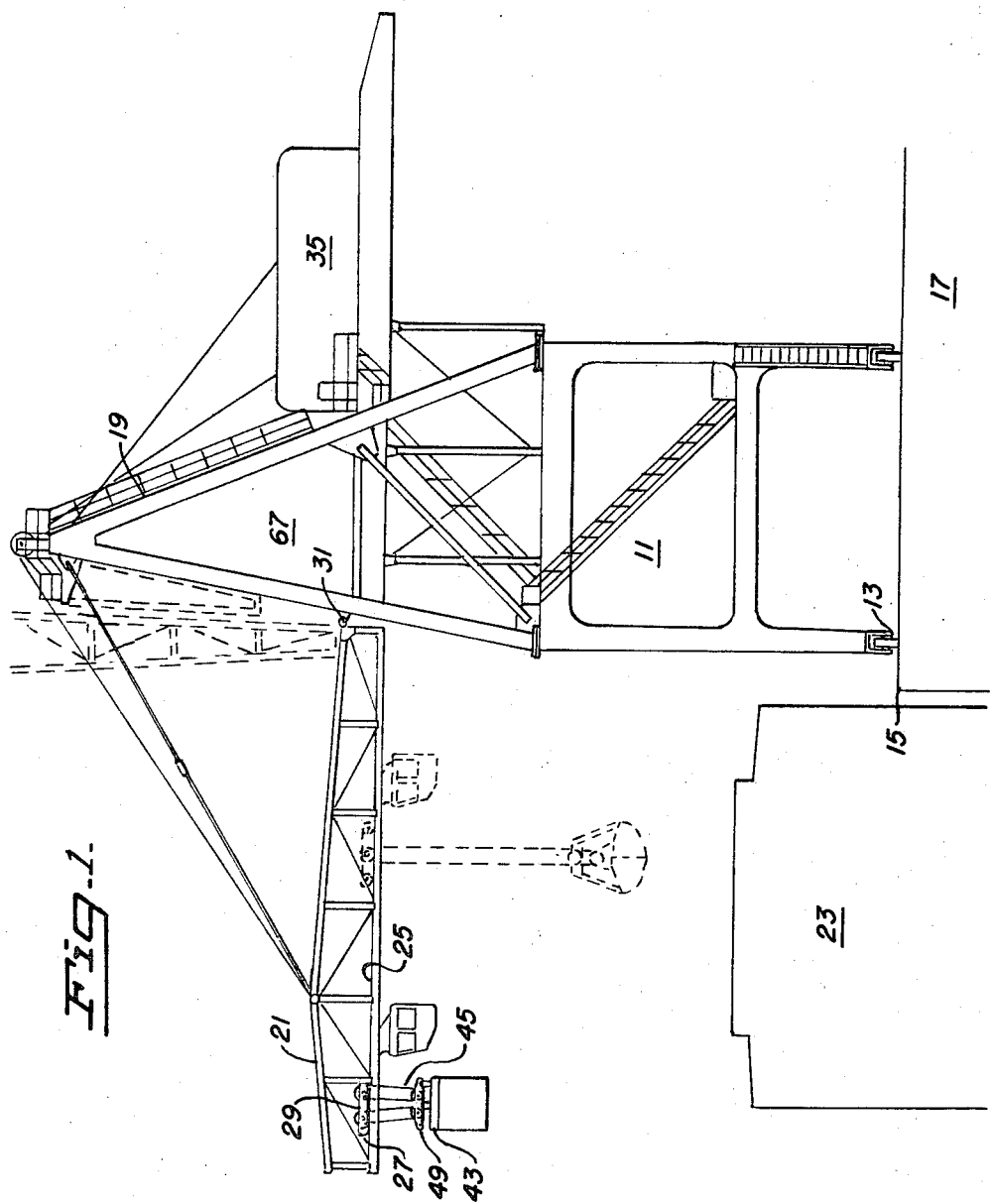
INVENTOR
CHARLES H. ZWEIFEL
BY
   *Charles O. Bruce*
      ATTORNEY

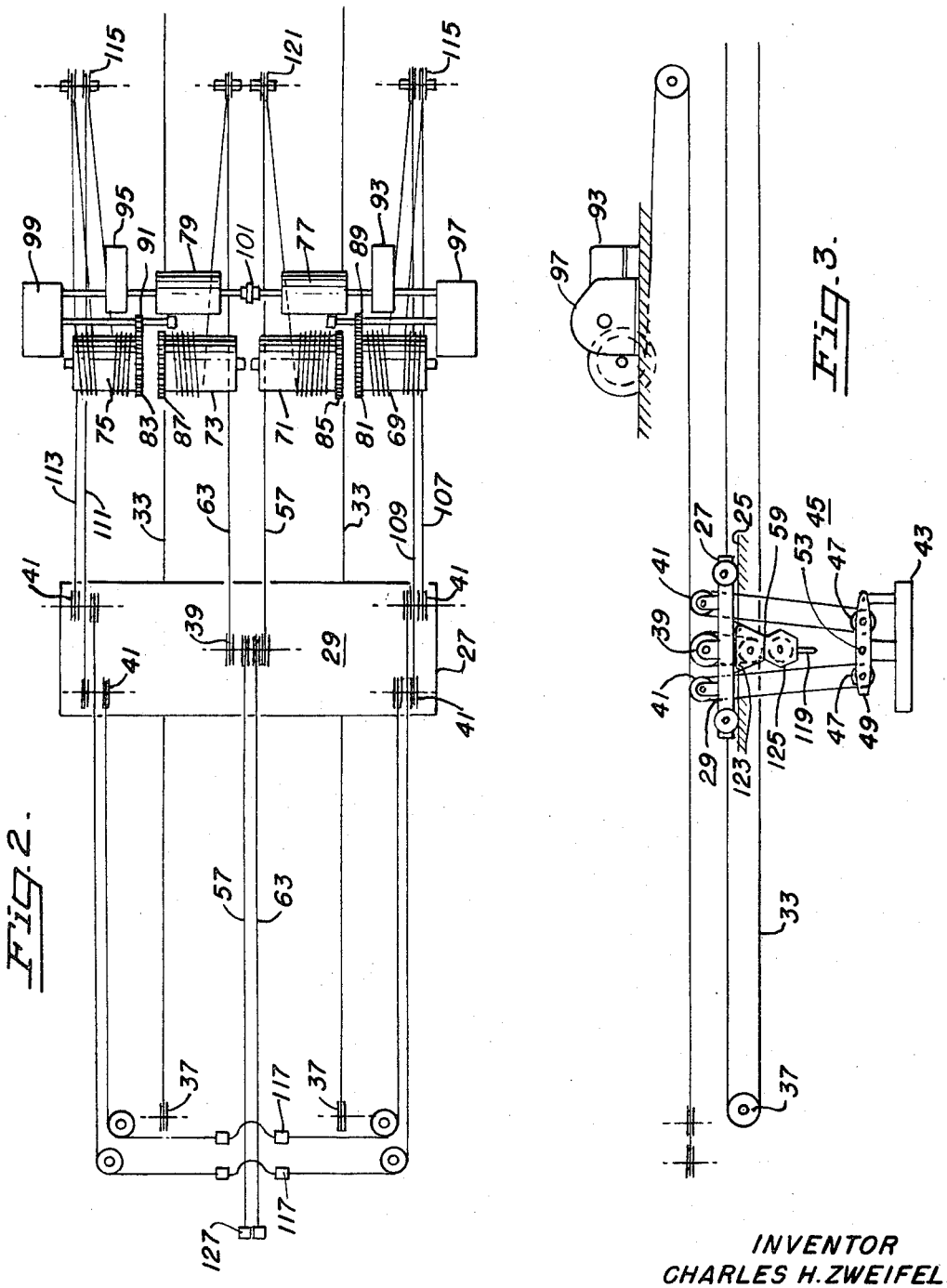

Sept. 24, 1968 C. H. ZWEIFEL 3,402,824
CONVERTIBLE CARGO HANDLING SYSTEM
Filed July 25, 1966 4 Sheets-Sheet 3
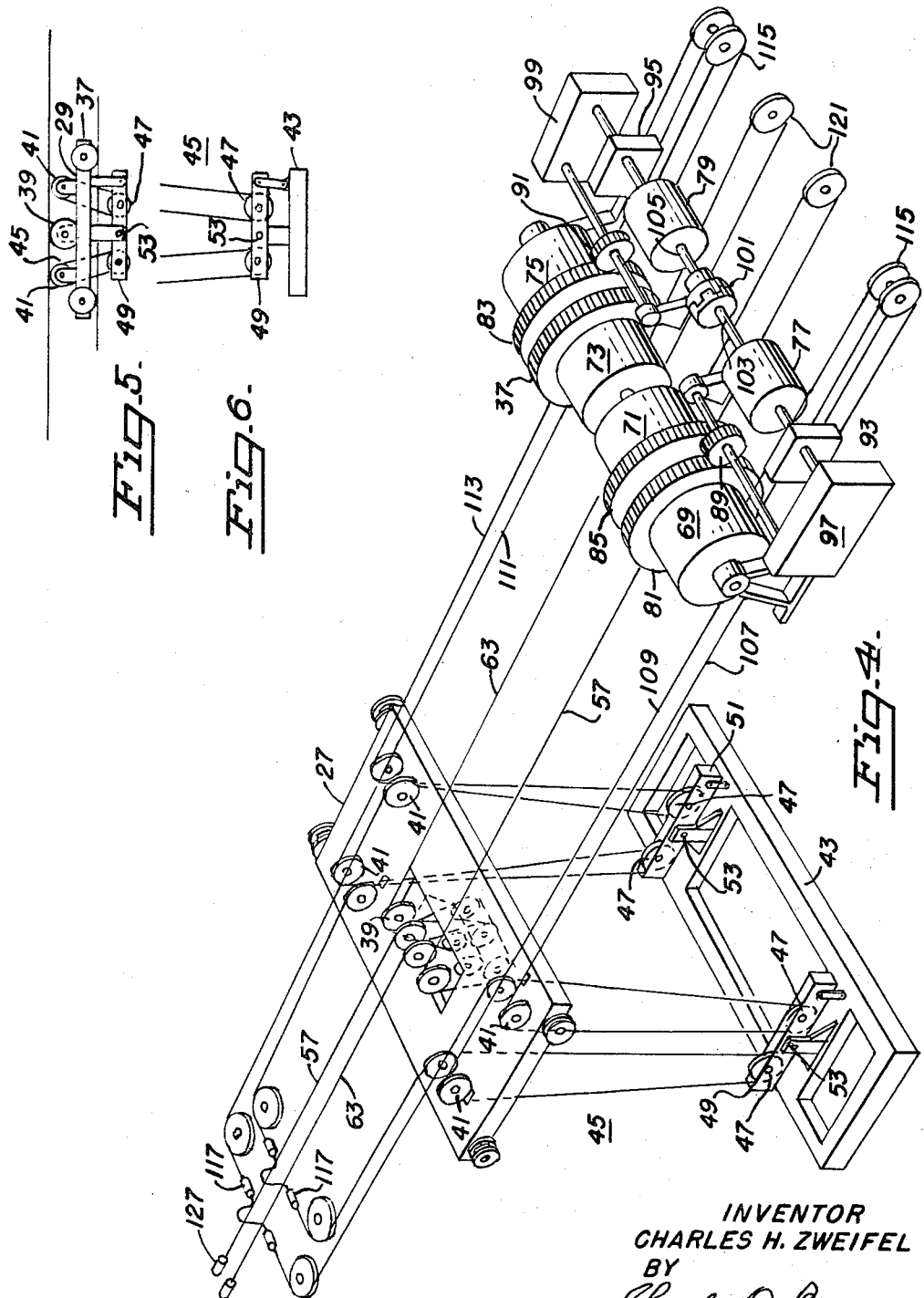
INVENTOR
CHARLES H. ZWEIFEL
BY
Charles O. Bruce
ATTORNEY Sept. 24, 1968
C. H. ZWEIFEL
3,402,824
CONVERTIBLE CARGO HANDLING SYSTEM
Filed July 25, 1966
4 Sheets-Sheet 4
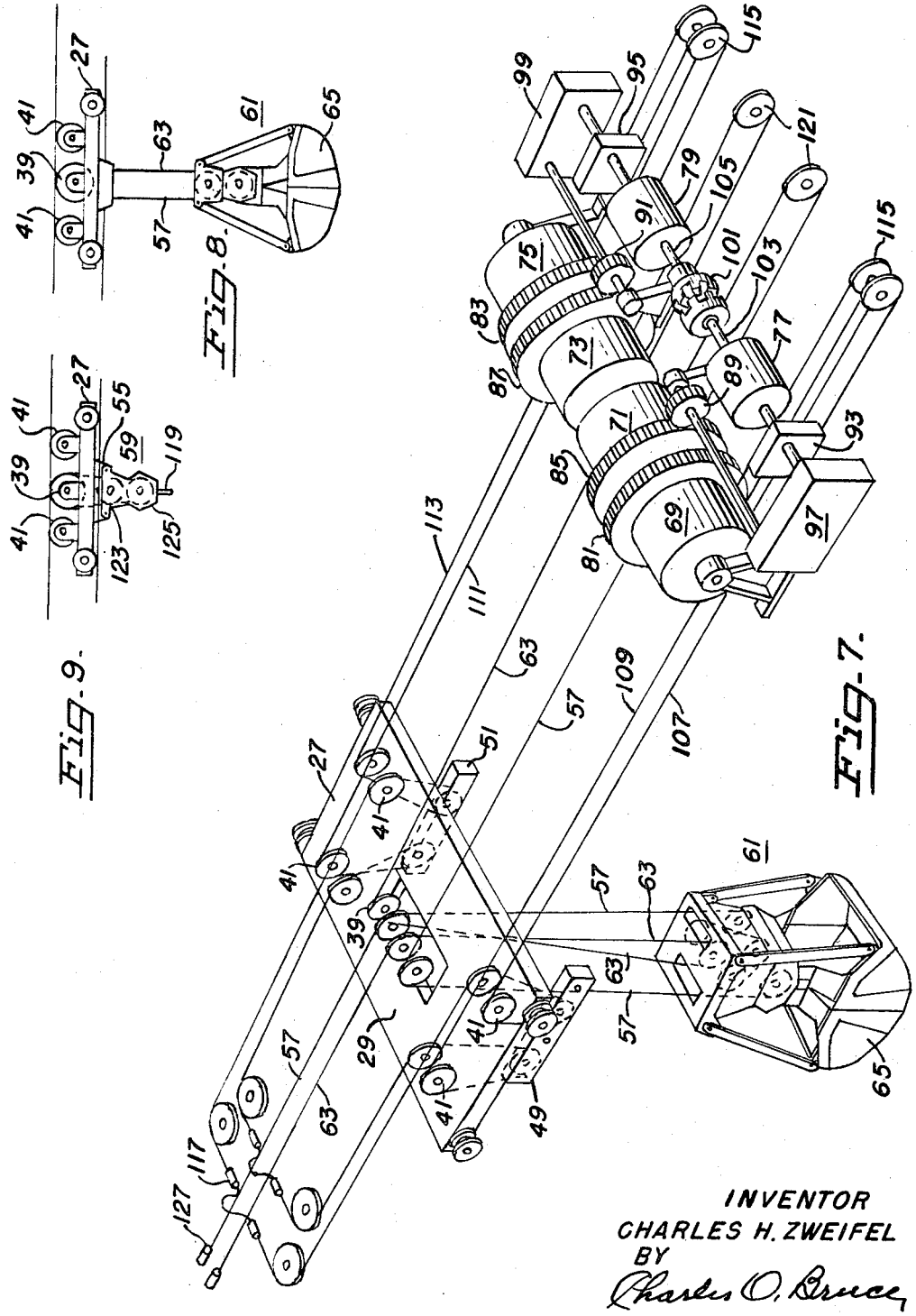
INVENTOR
CHARLES H. ZWEIFEL
BY
Charles O. Bruce
ATTORNEY

United States Patent Office

3,402,824
Patented Sept. 24, 1968

3,402,824
CONVERTIBLE CARGO HANDLING SYSTEM
Charles H. Zweifel, Oakland, Calif., assignor to
Pacific Coast Engineering Company, a corporation of California
Filed July 25, 1966, Ser. No. 567,436
17 Claims. (Cl. 212—17)

ABSTRACT OF THE DISCLOSURE

An integrated machinery and reeving system for a crane which permits conversion of the operation of the crane from bulk unloading to cargo container handling, or to operation of a magnet, a cargo hook, or a scrap skip. Four aligned wire rope drums are driven by two motors which can be interlocked to drive two of the drums and the associated reeving synchronously or the motors can be uncoupled to drive the other two drums and the associated reeving thereof independently.

BACKGROUND OF THE INVENTION

Field of the invention

This invention relates to a convertible cargo handling system and more particularly to a system for a combination crane which permits conversion from bulk unloading to cargo container handling, or to operation of a magnet, a cargo hook, or a scrap skip.

Description of the prior art

Due to the fact that ships have been used for hundreds of years for transporting cargo, it is a necessary corollary that many types of cranes have been utilized for the loading and unloading cargo therefrom. Presently, the efficient unloading of bulk materials such as grain, coal, ores, etc., is most usually accomplished by clamshell buckets. Until recently, crated and uncrated cargo had been handled most efficiently on pallets and transported between the ship and dockside by means of a sling suspended from a cargo hook. A recent innovation in the handling of crated or boxed cargo has been the use of large cargo containers which permit moving greater amounts of cargo with each cycle of the crane.

Prior to the introduction of cargo containers, some cargo handling cranes were considered combination loader-unloaders since a magnet, a scrap skip, a clamshell bucket, or a cargo hook can all be suspended by the same type of crane from essentially single point suspension. However, since cargo containers require four corner suspension and complicated reeving, there has not been a combination crane devised which integrates cargo container handling capacity with the more commonly used cargo handling means.

The characteristics of the standard type of crane as used for operation of a clamshell bucket, and those of a crane for handling cargo containers, are completely different. The clamshell bucket requires two separate sets of reeving; one for closing and lifting the bucket and a second independently driven set for holding the bucket. When utilizing a standard crane for operating a magnet or a cargo hook, one set of reeving is simply inactivated.

Cargo container handling equipment, on the other hand, requires a multiple rope integrated synchronously driven reeving system to suspend the cargo container. This is necessary to provide an equal rate of lift to all ropes irrespective of the distribution of load within the container. It effects a stable lifting platform for controlling a cargo container during lift and movement and generally requires at least four double ropes arranged in a generally rectangular suspension pattern. The ropes must therefore be suspended from a platform having a much larger suspension base than is necessary for a crane rigged for bucket operation or for cargo handling equipment having the characteristic of single point suspension.

Due to the large size and loading capacity of cargo containers, their use has required the development of cranes of considerably larger size and of different type construction than have generally been employed for the purpose of loading and unloading ships. The strength of the structure and the overall size, width, lifting capacity, reach, and lift have all necessarily been increased. The apron which supports the lifting apparatus has changed from a simple boom to a relatively wide apron for supporting a movable trolley.

In view of the increased capacity and size of the cargo container handling cranes, they are considerably more expensive than the standard type of crane. It therefore becomes very desirable to provide a combination crane for handling all types of cargo to eliminate the need for multiple cranes at dockside. Before the invention of the present system, no crane has been devised which can load and unload general cargo, scrap metal, cargo containers, and unload bulk material. Docking facilities have only had the capability of handling the particular type of cargo that the crane provided could accommodate. The present invention permits utilizing a single crane for a multiplicity of docking berths with a universal capacity for handling many types of cargo.

Summary of the invention

The present invention is basically a conversion system for a combination crane which permits either bulk unloading or cargo container handling, and can be used to operate a magnet, a cargo hook, or a scrap skip. The system permits integration of various cargo handling means into a single structure having common hoist and operating machinery. Briefly, the structure for effecting the convertible system comprises a trolley having sheave means disposed generally in the center thereof and sheave means disposed at four corners of a rectangular pattern large enough for stably suspending a cargo container lifting spreader. Wire rope reeving is arranged for suspending a bucket, a magnet, or a cargo hook from the sheave means disposed in the center of the trolley and wire rope reeving is also arranged for suspending a cargo container lifting spreader or a scrap skip from the sheave means disposed in the rectangular pattern. Hoist machinery is provided which includes means for independent operation of the portion of the wire rope reeving which is arranged for suspending a bucket, a magnet, or a cargo hook and includes means for synchronous operation of the portion of the wire rope reeving which is arranged for suspending a cargo container lifting spreader or a scrap skip.

The invention includes the method of converting the cargo handling system of a crane, provided with a movable trolley having reeving for suspending a bucket headblock or a cargo container lifting spreader therefrom, from operation of a bucket to operation of a magnet, a cargo hook, a cargo container lifting spreader, or a scrap skip. The method comprises for operation of a bucket; attaching clamshell doors to the headblock; for operation of a magnet or a cargo hook; removing the clamshell doors of the bucket and securing a magnet or a cargo hook to the bucket headblock; for operation of a cargo container lifting spreader; removing the clamshell doors or the magnet or the cargo hook from the headblock, securing the headblock to the trolley, releasing the cargo container lifting spreader supporting reeving from the trolley, and securing the reeving to a lifting spreader; and for operation of a scrap skip; removing the cargo container lifting spreader supporting reeving from the lifting spreader, and securing the reeving to a scrap skip.

The primary advantage of the present invention is that conversion from one type of operation to another is accomplished without rereeving of the wire ropes.

Objects of the invention

It is therefore an object of the present invention to provide a simple conversion system for a combination crane which permits easy switching from bulk unloading to cargo container handling, or to operation of a bucket, a magnet, or a scrap skip.

It is another object of the present invention to provide a convertible cargo handling system which can easily and quickly be converted from one type of operation to another without the necessity of rereeving.

It is a further object of the present invention to provide a convertible cargo handling system which utilizes only two hoist motors and yet is capable of synchronous operation of the wire rope reeving for handling a cargo container lifting spreader and likewise capable of independent operation of the wire rope reeving for operating a clamshell bucket.

It is yet another object of the present invention to provide a convertible cargo handling system which permits a clamshell bucket, a magnet, a cargo hook, a scrap skip, or a cargo container lifting spreader to be suspended and operated from a single movable trolley.

It is still a further object of the present invention to provide a convertible cargo handling system which can be utilized to modify cargo container handling cranes to combination bulk unloader-cargo container handling cranes.

It is still another object of the present invention to provide a method for converting cargo handling systems of a crane from one type operation to another which is efficient, simple, and adaptable for universal switching from one type of operation to another.

Other objects and advantages of the present invention will become apparent when the combination crane is considered in conjunction with the accompanying drawings of which:

Description of the drawings

FIGURE 1 is a side elevation of a crane for use with the convertible cargo handling system of the present invention;

FIGURE 2 is a schematic plan view of the convertible cargo handling system of the present invention;

FIGURE 3 is a schematic side elevation of the convertible cargo handling system of the present invention;

FIGURE 4 is a schematic perspective view of the convertible cargo handling system arranged for operation of a cargo container lifting spreader;

FIGURE 5 is a schematic side elevation of the trolley of the present invention showing the headframes of a cargo container lifting spreader suspension system secured to the trolley;

FIGURE 6 is a schematic side elevation of the trolley of the present invention showing the head frames connected to a cargo container lifting spreader;

FIGURE 7 is a schematic perspective view of the convertible cargo handling system of the present invention arranged for operation of a clamshell bucket;

FIGURE 8 is a schematic side elevation of the trolley of the present invention showing the suspension of a clamshell bucket; and FIGURE 9 is a schematic side elevation of the trolley of the present invention showing the headblock of the clamshell bucket secured to the trolley.

Description of the preferred embodiment

Reference is made to the drawings for a detailed description of a preferred embodiment of the present invention. FIGURE 1 illustrates the basic structure of a crane embodying the convertible cargo handling system. A crane frame 11 is provided which is supported on rails 13 that run parallel the edge 15 of the loading dock of pier 17. In the preferred embodiment, a structure utilizing a pair of interconnected "A" frames 19 with a cantilever folding boom or apron 21 is shown, but the present invention can be utilized on any structure having an apron for supporting a movable trolley. The apron can be supported at both ends over the working area by means of a bridge or can project thereover in the form of a jib or cantilevered boom.

The apron 21 of the crane extends over the docked ship 23 and provides a support for a pair of trolley rails 25. A trolley 27 having a generally rectangular platform 29 is adapted for movement on the rails of the apron outboard to a position over the ship and inboard beyond the junction 31 of the apron with the crane. When the apron is raised, the trolley is stored inboard of the junction.

Means are provided for moving the trolley 27 along the apron rails 25. In the preferred embodiment, wire ropes 33 running from machinery house 35 are secured to the trolley. The ropes then pass around sheaves 37 at the end of the apron and run back to the machinery house. They are driven from a power source independent of the ones to be described in connection with the present invention.

The trolley 27 is provided with two sets of sheaves 39 (FIGURE 2) disposed generally in the center of the platform 29 and with a set of sheaves 41 disposed generally at each corner of the platform. The sets of sheaves 41 disposed at the corners of the trolley have double pulleys and are arranged in a generally rectangular pattern which is approximately the size of a cargo container lifting spreader. In practice, the spreader 43 is generally shorter in length than a cargo container, but just as wide. Reeving 45 (FIGURES 3, 4, 6) suspends lowerable blocks 47 below the platform from the sheaves 41. The two blocks at each end of the platform are secured to a common head frame 49, 51 which maintain the spaced relationship between the two blocks at each end of the spreader 43.

The two head frames 49, 51 can be connected either to a cargo container lifting spreader 43 or to the lifting slings of a scrap skip (not illustrated). When the lifting spreader is not being used, the pins 53 which secure the lifting spreader 43 to the head frames 49, 51 are removed, and the lifting spreader is set aside. If the two head frames are not then used for suspending a scrap skip, they are lifted up under the trolley platform 29 and pinned to the trolley framework 55. The load of the head frames 49, 51 and the blocks 47 is thereby taken off the reeving 45, and they are secured up and out of the way when not in use. By being secured to the trolley frame, they provide easy and stable fleeting of the reeving 45 therethrough when the trolley is moved along the apron.

The two sets of sheaves 39 disposed in the center of the platform each have double pulleys. One of the sets of sheaves guides the reeving 57 (FIGURES 7, 8, 9) which suspends the removable head block 59 of a clamshell bucket 61. This is called the hold line. The other set of sheaves guides the reeving 63 which opens and closes the removable doors 65 of the bucket. This is called the close line.

When the reeving 45 guided by the sheaves 41 disposed in the corners of the platform is suspending a cargo container lifting spreader, the headblock 59 of the bucket is pinned below the trolley platform to the framework 55 (FIGURE 3) where it does not interfere with the cargo handling apparatus in use. FIGURES 5 and 6 show the relationship of one of the head frames 49 to the trolley 27 without the bucket headblock 59 while FIGURES 8 and 9 show the relationship of the bucket 61 and the bucket headblock 59 to the trolley without the head frames.

The hoist machinery for operating the bulk unloader and cargo container handling equipment is supported by the crane superstructure 67 in the machinery house 35; generally at the level of the apron 21 and inboard of the junction 31 of the apron with the crane. The basic elements of the hoist machinery include four aligned wire rope drums 69, 71, 73, 75 which are driven by two hoist motors 77, 79 (FIGURES 2, 4 and 7). The four drums are aligned on an axis substantially perpendicular to the apron 21.

The wire rope drums include large spur gears 81, 83 mounted on the inboard ends of the two outboard drums 69, 75 and similar spur gears 85, 87 mounted on the outboard ends of the two inboard or center drums 71, 73. In other words, the two drums on each side of center have spur gears on adjacent ends.

Two shiftable pinion gears 89, 91 are provided, one of which is capable of engaging either of two adjacent spur gears while the other is capable of engaging either of the other two adjacent spur gears. In other words, each pinion gear 89, 91 is shiftable between adjacent spur gears 81, 85 or 83, 87 of the inboard and outboard drum. The two pinion gears 89, 91 are independently driven by the motors 77, 79, each through a hoist brake 93, 95 and a speed reducer 97, 99.

A disengageable coupling 101 is mounted on shafts 103, 105 extending between the motors 77, 79 for permitting independent operation of the motors or for interconnecting them for synchronous and cooperative operation.

Locking means (not illustrated) are provided for engaging the drums 69, 75 to hold them in a fixed position when not driven by their respective pinion gears. This locking means can simply comprise pins which engage the drums or the spur gears at the ends of the drums.

Two wire ropes 107, 109, and 111, 113 are reeved from each of the two outboard drums 69, 75 through the sets of sheaves 41 disposed in the corners of the trolley platform for suspending a cargo container lifting spreader 43 or a scrap skip. Each of the wire ripes is reeved through only one set of the sheaves and the two wire ropes from the same drum are reeved through the two sets of sheaves at the same end of the platform. In the preferred embodiment, the wire ropes 107, 109 and 111, 113 first run inboard to reversing sheaves 115 mounted on the crane frame and then outboard to the sets of sheaves 41 mounted on the trolley 27. One rope 107, 113 from each of the outboard drums 69, 75 runs to an inboard sheave 41 on the trolley. They pass down around the respective lowerable blocks 47 secured in the headframes 49, 51 and return up around the other of the inboard sheaves. They then continue outboard to fleet through the sheaves disposed in the outboard corners of the trolley and are adjustable dead-ended 117 at the end of the apron.

The other two ropes 111, 113 from the outboard drums first run inboard to reversing sheaves 115 and then run outboard to fleet through the sheaves disposed at the inboard corners of the trolley and pass over one of double outboard sheaves. They pass down around the respective lowerable blocks 47 secured in the headframes 49, 51 and return up around the other of the outboard sheaves. They then continue outboard to the end of the apron where they are likewise adjustably dead-ended 117. All of the wire ropes reeved from the two outboard drums are adjustably dead-ended to permit changing the length of the wire ropes to keep the headframes 49, 51 level.

A wire rope 63, 57 is reeved from each of the two inboard or middle drums 71, 73 through one of the two sets of centrally disposed trolley sheaves 39 for suspending a clamshell bucket, a magnet, or a cargo book. Each of the wire ropes is reeved through only one of the sets of sheaves. A camshell bucket headblock 59 is permanently received into the two wire ropes 63, 57 and either a cargo hook or magnet can be suspended from the lower end 119 thereof when the clamshell doors are removed. As with the ropes from the outboard drums, the ropes 63, 57 from the two inboard drums run inboard through reversing sheaves 121 before running outboard to the trolley. After passing over their respective sheaves disposed in the center of the trolley, the ropes 63, 57 pass downward into the bucket headblock 59 which is comprised of two parts; an upper portion 123 which forms the pivot block for the doors of the bucket and a lower movable portion 125 which controls the opening and closing of the doors. The hold rope which supports the headlock is simply reeved through a sheave system in the upper portion thereof. The closed rope for operating the bucket doors is reeved through sheaves in both the upper and lower portions of the headblock. The ropes return to the trolley from the headblock and pass up and over the two remaining centrally disposed sheaves and continue outboard to the end of the apron where they are dead-ended 127. There is no need for an adjustable dead-end on the ropes as the hoist drums take up any slack that occurs in the reeving and the headblock is automatically self-leveling.

The two hoist motors 77, 79 are controlled by separate DC adjustable voltage generators. For bucket operation, the two motors can be controlled by separate switches for permitting independent operation of the motors. Operation of the crane in this manner depends upon operator dexterity for efficient manipulation of the bucket. About 95 percent of the buckets in use are operated this way. As the doors of the bucket close, and the closing motor starts to take the load, the operator must start to take in on the hold line to help lift the bucket. One motor is responsible for closing the bucket doors and lifting the bucket by means of the close line. The other motor assists the first motor during lifting and holds the bucket for permitting the close line to feed into the bucket reeving for opening the doors to unload it. The operator can unload the bucket by stopping the lifting and simultaneously taking in on the hold line, or by holding with the hold line and letting out on the close line.

An electrically synchronization system can also be used for bucket control in place of operator dexterity. These systems generally permit the close line to assume about 52 percent of the load, by means of a torque-sensing device, before the hold line begins to lift.

Either system can be used in conjunction with operation of the bucket reeving of the present invention, but when the system is used for operating a cargo container lifting spreader, control of the motors is transferred to a single master switch to insure synchronous operation.

When the crane is to be used for bulk unloading by means of a bucket, the head frames 49, 51 are pin-connected to the trolley framework 55 where they are up and out of the way of the bulk unloading operation. The two outboard hoist drums 69, 75 are locked against rotation to prevent reeving from pulling off the drums as a result of movement of the trolley 27 along the apron 21. The pinion gears 89, 91 are shifted to engage the spur gears 85, 87 of the two inboard drums 71, 73. The coupling 101 between the hoist motors 77, 79 is disengaged and the bucket headblock 59 is released from the trolley and lowered to the dockside. Clamshell bucket doors 65 are pin-connected to the bucket headblock 59, and electrical control of the generators for operating the motors 77, 79 is transferred to independent switches. The crane is then properly rigged for bucket operation.

For operation of the crane with a magnet or a cargo hook, the bucket 61 is lowered to the dockside and the clamshell doors 65 are removed and set aside. The cargo hook or magnet is secured to the lower end 119 of the headblock 59. Electrical control of the generators is transferred to a single master switch so that both sets of the bucket reeving operate synchonously to prevent slack. Engaging the coupling 101 between the motors will insure that no slack occurs.

For switching to cargo container handling operations, the bucket 61, or the headblock 59 with a magnet or cargo hook attached, is lowered to dockside and the clamshell doors 65 of the bucket (or the magnet or the cargo hook) are removed. The bucket headblock is raised and pin-connected to the framework 55 of the trolley. The two inboard wire rope drums 71, 73 of the hoist machinery are locked against rotation. The shiftable pinion gears 89, 91 are shifted to engage the spur gears 81, 83 of the two outboard drums 69, 75 which are then unlocked for rotation. The coupling 101 between the two motors 77, 79 is engaged and electrical control of the generators is transferred to a single master switch for synchronous operation. Tthe head frames 49, 51 are released from their positions beneath the trolley 27 and are lowered to dockside where they are pin-connected to the cargo container lifting spreader 43. The crane is then properly rigged for cargo container loading or unloading operations and the hoist motors cooperate and share the total load irrespective of the individual loads on the drums, which can be different, due to unbalanced containers.

To employ a scrap skip, the head frames 49, 51 are simply disconnected from the lifting spreader and shifted to the skip. The coupling between the motors is disengaged and control of the DC generator for lifting and lowering is effected by a single master switch. For dumping the skip, control of the generators must be transferred to two independent switches in order to permit independent lifting of one end of it.

During any type of operation, the reeving stays permanently reeved with the wire ropes from the outboard and inboard drums merely fleeting through the sheaves during trolley movement. This is one of the most important characteristics of the invention; the fact that the trolley is permanently reeved and change-over from one type of operation to another is accomplished without any rereeving of the wire ropes.

Thus, the present invention, in addition to the novel structure provided, contemplates a new method of converting the cargo handling means of a crane as herein described from one type of cargo handling operation to another. This comprises for bulk unloading operations; holding the reeving suspended from the corner sheaves against the trolley, locking the two drums having double lines running therefrom against rotation, engaging the pinion gears with the two drums having single lines running therefrom and unlocking same for rotation, attaching the clamshell doors to the headblock suspended by the wire ropes reeved from the two sets of sheaves disposed in the center of the trolley, disengaging the coupling between the motors, and switching control of the motors to independent switches.

Operation of a magnet or a cargo hook comprises; holding the reeving suspended from the corner sheaves against the trolley, locking the drums having two lines running therefrom against rotation, shifting the pinion gears to engage the two drums having single lines running therefrom and unlocking same for rotation, securing a magnet or a cargo hook to the lower end of the bucket headblock, and switching control of the motors to a single master switch.

Operation of a cargo container lifting spreader comprises; securing the bucket headblock to the trolley, locking the two drums having single lines running therefrom against rotation, shifting the pinion gears to engage the two drums having double lines running therefrom and unlocking same for rotation, engaging the coupling between the motors, securing a cargo container lifting spreader to the reeving suspended from the sheaves disposed in the corners of the trolley, and switching control of the motors to a single master switch.

Operation of a scrap skip comprises; securing the bucket headblock to the trolley, locking the drums having single lines running therefrom against rotation, shifting the pinion gears to engage the two drums having double lines running therefrom and unlocking same for rotation, disengaging the coupling between the motors, securing a scrap skip to the reeving suspended from the sheaves disposed in the corners of the trolley, and switching control of the motors to independent switches.

It is to be understood that the conversion can be made from any type of operation to another and that it is not necessary to proceed from one type of operation to another in the order described. In most cases it is not even necessary to do each step in the order set forth. It is only necessary that all of the steps set forth for the conversion operations be performed.

Inherent in this invention is the method of powering and operating a convertible cargo handling system which comprises; providing the two motors, interconnecting the synchronously driven set of reeving, disengaging said motors when operating the independently driven set of reeving, operating at least two wire rope drums independently when the motors are disengaged, and operating at least two wire rope drums synchronously when the motors are interconnected.

The new and novel results produced by the combination bulk unloader and cargo container handling equipment of the present invention, and the method of conversion from one type of operation to another, are achieved, essentially, by two important characteristics of the device. The first is the placing of the two different sets of reeving system sheaves on the same trolley for permitting permanent reeving. One set of sheaves is disposed in each corner of the trolley for supporting the cargo container lifting spreader and two sets of sheaves are disposed in the center of the trolley for supporting a bucket, a magnet, or a cargo hook. The sheaves are of the fleet-through type and permit motion of the trolley without removal of the reeving. The use of a clamshell bucket having detachable doors and the use of detachable cargo container lifting spreader head frames, both of which can be pin-connected to the trolley when not in use, are part of this feature which permits the permanent reeving of the system.

The second important characteristic of the invention is the use of the two hoist motors which may be coupled together for synchronous and cooperative operation or disengaged for independent operation. This permits the load to be shared by two motors when lifting the heavy cargo containers, and yet the same power source can be converted to provide the necessary independent power sources for handling bucket operations. This eliminates the need for independent power sources for each type of operation since the two motors can be arranged to operate two independent and different reeving systems.

It is these two main features, the permanently reeved trolley and the use of interconnectable motors, which are the essential elements of the invention. They provide the simplicity of the arrangement, require only a minimum of wire rope reeving, and effect the efficiency and economy of equipment whereby sufficient power is provided for operating each of the cargo handling means at its maximum capacity without requiring unnecessary or overpowered motors.

It will be apparent from the foregoing description of the invention, in its preferred form, that it will fulfill all of the objects attributable thereto. While it has been illustrated and described in considerable detail, the invention is not to be limited to such details as have been set forth except as may be necessitated by the appended claims.

I claim:
1. Bulk unloader and cargo container handling equipment for a crane comprising
   a trolley having sheave means disposed generally in the center thereof and sheave means disposed at four corners of a rectangular pattern large enough for stably suspending a cargo container lifting spreader,
   wire rope reeving arranged for suspending a bucket, a magnet, or a cargo hook from the sheave means disposed in the center of said trolley and wire rope reeving arranged for suspending a cargo container lifting spreader or a scrap skip from the sheave means disposed in said rectangular pattern, and hoist machinery including means for independent operation of the portions of said wire rope reeving arranged for suspending a bucket, a magnet, or a cargo hook, and means for synchronous operation of the portions of said wire rope reeving arranged for suspending a cargo container lifting spreader or a scrap skip.

2. The bulk unloader and cargo container handling equipment of claim 1 wherein said hoist machinery includes two hoist motors and a disengageable coupling means which may be coupled for interlocking said motors and operating portions of said wire rope reeving synchronously, or disengaged for independent operation of said motors and portions of said wire rope reeving.

3. The bulk unloader and cargo container handling equipment of claim 1 wherein said hoist machinery includes at least two wire rope hoist drums for operating said reeving and means for driving at least two of said drums independently and at least two of said drums synchronously.

4. The bulk unloader and cargo container handling equipment of claim 1 wherein said trolley has a platform of a generally rectangular configuration and said centrally disposed sheave means includes two sets of sheaves and said sheave means disposed in a rectangular pattern includes a set of sheaves disposed generally in each corner of said trolley platform.

5. The bulk unloader and cargo container handling equipment of claim 4 wherein said hoist machinery includes at least two wire rope hoist drums for operating said reeving and means for driving at least two of said drums independently and at least two of said drums synchronously.

6. The bulk unloader and cargo container handling equipment of claim 4 wherein said hoist machinery includes two hoist motors and a disengageable coupling means which may be coupled for interlocking said motors and operating portions of said wire rope reeving synchronously, or disengaged for independent operation of said motors and portions of said wire rope reeving.

7. The bulk unloader and cargo container handling equipment of claim 6 wherein said hoist machinery includes at least two wire rope hoist drums for operating said reeving and means for driving at least two of said drums independently and at least two of said drums synchronously.

8. Combination bulk unloader and cargo container handling equipment for a crane comprising a trolley having a generally rectangular platform and adapted for movement on rails supported by said crane, means for moving said trolley along said rails, two sets of sheaves disposed generally in the center of said trolley platform and a set of sheaves disposed generally in each corner of said trolley platform, hoist machinery including four wire rope drums and two motors, a disengageable coupling for interlocking said motors and driving two of said drums synchronously or unlocking said motors and driving the other two drums independently, wire rope reeved from each of said synchronously driveable drums and from the sets of sheaves disposed in the corners of said trolley platform for suspending a cargo container lifting spreader or a scrap skip, each of said wire ropes reeved through only one of said sets of sheaves, and wire rope reeved from each of said independently driveable drums and from the sets of sheaves disposed in the center of said trolley platform for suspending a bucket, a magnet, or a cargo hook, each of said wire ropes reeved through only one of the two sets of centrally disposed trolley sheaves.

9. The bulk unloader and cargo container handling equipment of claim 8 wherein the means for permitting the synchronous or independent driving of said drums includes spur gears on each of said drums and shiftable pinion gears driven by said motors for engaging said spur gears.

10. The bulk unloader and cargo container handling equipment of claim 8 including two wire ropes reeved from each of said synchronously driven drums through the sets of sheaves disposed in the corners of said trolley platform, each of said wire ropes reeved through only one of said sets of sheaves and the two wire ropes from the same drum reeved through the sheaves at the same end of said trolley, and a wire rope reeved from each of said independently driven drums through the two sets of centrally disposed sheaves, each of said wire ropes reeved through only one of said sets of sheaves.

11. The bulk unloader and cargo container handling equipment of claim 10 wherein said wire rope drums are aligned on a common axis.

12. The bulk unloader and cargo container handling equipment of claim 11 wherein the means for permitting the synchronous or independent driving of said drums includes spur gears on each of said drums and shiftable pinion gears driven by said motors for engaging said spur gears.

13. Combination bulk unloading and cargo container handling equipment for a crane having a supporting frame and an apron supporting trolley rails, said equipment comprising a trolley having a generally rectangular platform and adapted for movement on the rails of said apron, means for moving said trolley along said rails, two sets of sheaves disposed generally in the center of said trolley platform and a set of sheaves disposed generally in each corner of said trolley platform, hoist machinery supported by said crane frame, said machinery including four aligned wire rope drums having spur gears on each of said drums and two motors having a disengageable coupling therebetween, each of said motors driving a shiftable pinion gear which engages the spur gears of either of two adjacent drums, two wire ropes reeved from each of the two outboard of said drums through the sets of sheaves disposed in the corners of said trolley platform for suspending a cargo container lifting spreader or a scrap skip, each of said wire ropes being reeved through only one set of said sheaves and the two wire ropes from the same drum being reeved through the two sets of sheaves at the same end of the platform, said wire ropes being adjustably dead-ended, and a wire rope reeved from each of the two middle drums through one of the two sets of centrally disposed trolley sheaves for suspending a bucket, a magnet, or a cargo hook, each of said ropes being reeved through only one of said sets of sheaves and dead-ended.

14. In a convertible cargo handling system having a set of independently driven reeving and a synchronously driven set of reeving, the method of powering and operating said system comprising providing at least two motors, mechanically interconnecting said motors to effect a single drive to operate said synchronously driven set of reeving and mechanically disengaging said motors to operate said independently driven set of reeving.

15. In the convertible cargo handling system of claim 14 including shiftable pinion gears driven by each of said motors, and four wire rope drums having spur gears engageable with said pinion gears, the method of powering and operating said system comprising engaging the pinion gears with the spur gears of two of said drums when said motors are interconnected to effect synchronous operation of the reeving, and shifting said pinion gears to engage the spur gears of the other two of said drums when said motors are uncoupled to permit independent operation of the reeving.

16. In the convertible cargo handling system of claim 14 including at least two wire rope hoist drums the method of powering and operating said system comprising disengaging said motors to operate two of said drums independently of each other, and interconnecting said motors to operate two of said drums synchronously.

17. In the convertible cargo handling system of claim 11 including two shiftable pinion gears driven by said motors, four wire rope drums having spur gears engageable with said pinion gears, the method of powering and operating said system comprising engaging the pinion gears with two of said drums when said motors are interconnected to operate said reeving synchronously, and shifting said pinion gears to engage the other two of said drums when said motors are uncoupled to operate said reeving independently.

References Cited

UNITED STATES PATENTS

| 3,074,563 | 1/1963 | Montgomery | 212—15 |
| 3,102,642 | 9/1963 | Zweifel | 212—15 |
| 3,286,863 | 11/1966 | Thompson | 214—656 |

FOREIGN PATENTS 285,248  12/1952  Switzerland.

ANDRES H. NIELSEN, *Primary Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,402,824                                    September 24, 1968

Charles H. Zweifel

It is certified that error appears in the above identified patent and that said Letters Patent are hereby corrected as shown below:

Column 4, line 1, "of", second occurrence, should read -- or --; line 8, after "jib" insert -- crane --. Column 5, line 53, "adjustable" should read -- adjustably --; line 70, "book" should read -- hook --; line 73, "received" should read -- reeved --. Column 6, line 12, "closed" should read -- close --; line 40, "electrically" should read -- electrical --. Column 7, line 14, "Tthe" should read -- The --; line 25, "generator" should read -- generators --. Column 11, line 18, claim reference numeral "11" should read -- 14 --.

Signed and sealed this 21st day of October 1969.

(SEAL)
Attest:

Edward M. Fletcher, Jr.                                     WILLIAM E. SCHUYLER, JR.

Attesting Officer                                                   Commissioner of Patents

U.S. DEPARTMENT OF COMMERCE

PATENT OFFICE

Washington, D.C. 20231

UNITED STATES PATENT OFFICE
CERTIFICATE OF CORRECTION

Patent No. 3,402,824            September 24, 1968

Charles H. Zweifel

It is certified that error appears in the above identified patent and that said Letters Patent are hereby corrected as shown below:

Column 11, line 18, cancel "two".

Signed and sealed this 23rd day of February 1971.

(SEAL)
Attest:

Edward M. Fletcher, Jr.
Attesting Officer

WILLIAM E. SCHUYLER, JR.
Commissioner of Patents